(No Model.) 2 Sheets—Sheet 1.

J. McINTYRE.
CLAPBOARD MACHINE.

No. 375,887. Patented Jan. 3, 1888.

WITNESSES
Chas. Spaulding
Robert McIntyre

INVENTOR
James McIntyre (No Model.) 2 Sheets—Sheet 2.

J. McINTYRE.
CLAPBOARD MACHINE.

No. 375,887. Patented Jan. 3, 1888.

WITNESSES
Chas. Spaulding
Robert McIntyre

INVENTOR
James McIntyre

UNITED STATES PATENT OFFICE.

JAMES McINTYRE, OF BOSTON, MASSACHUSETTS.

CLAPBOARD-MACHINE.

SPECIFICATION forming part of Letters Patent No. 375,887, dated January 3, 1888.

Application filed February 26, 1887. Serial No. 229,028. (No model.)

*To all whom it may concern:*

Be it known that I, JAMES MCINTYRE, of Boston, in the county of Suffolk and State of Massachusetts, have invented certain new and useful Improvements in Machines for Sawing Clapboards, of which the following is a full, clear, and exact description.

These improvements in machines for sawing clapboards consist, in substance, first, in a machine for sawing clapboards from a log or other suitable blank, and which machine otherwise is of suitable construction, the combination of two or more separate vertical rotating circular saws placed in advance of each other and relatively arranged to saw the log along its length and in separate lines more or less radial with the center of the log or with a given point eccentric thereto; second, in a machine for sawing clapboards from a log or other suitable blank, and which machine otherwise is of suitable construction and has means for suspending and centering said log or other blank end to end, the combination of an auger or other suitable tool for boring it in and along the direction of its length and on a line eccentric to said means of suspension and centering of the log; third, in a machine for sawing clapboards from a log or other suitable blank and which machine otherwise is of suitable construction, the combination of a rotating circular saw arranged to saw the log along its length and in a line more or less radial with the center of the log or with a given point eccentric thereto and an auger or other suitable tool for boring said log or blank in the direction of its length, all substantially as hereinafter described.

Figure 1:
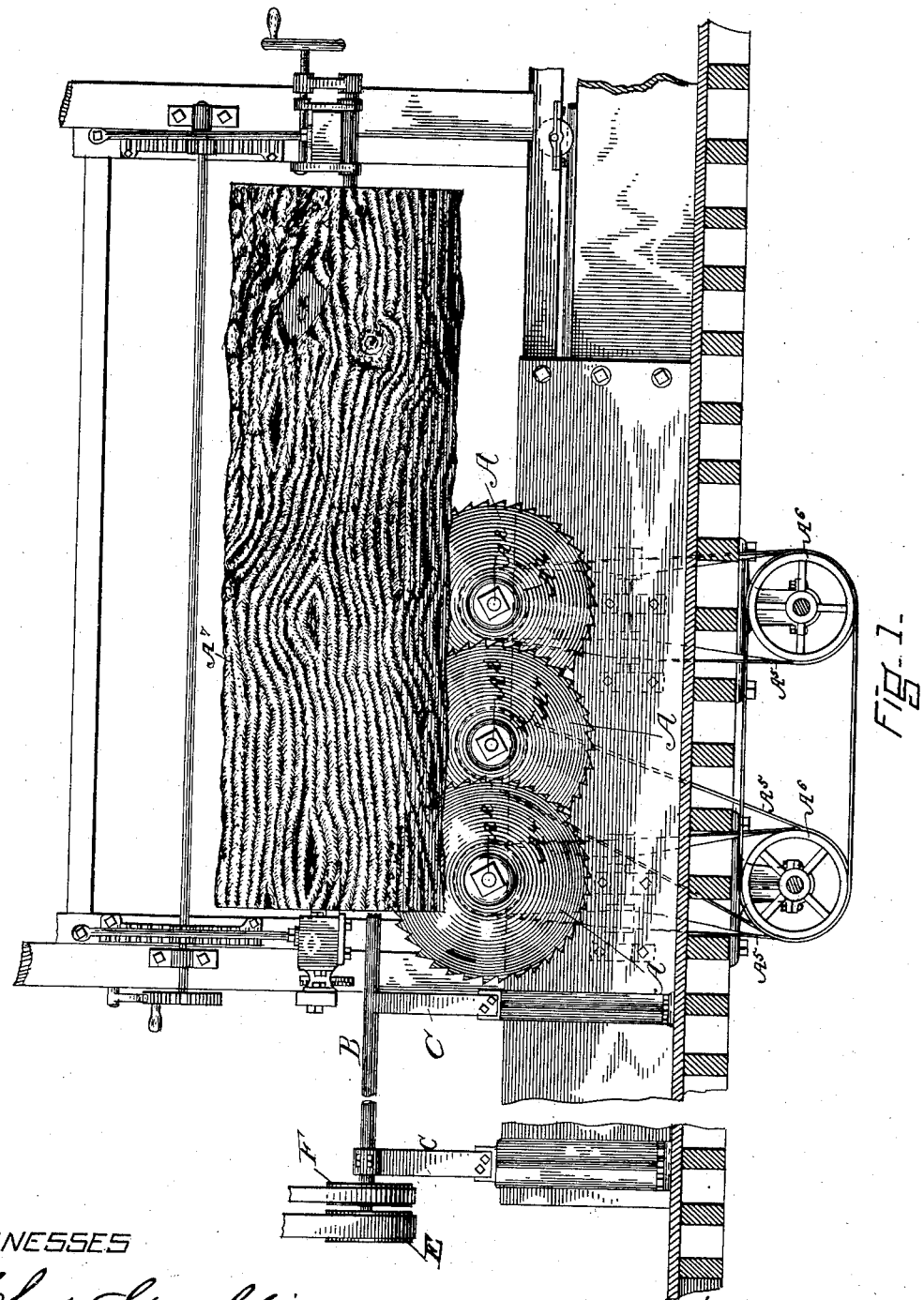
Figure 2:
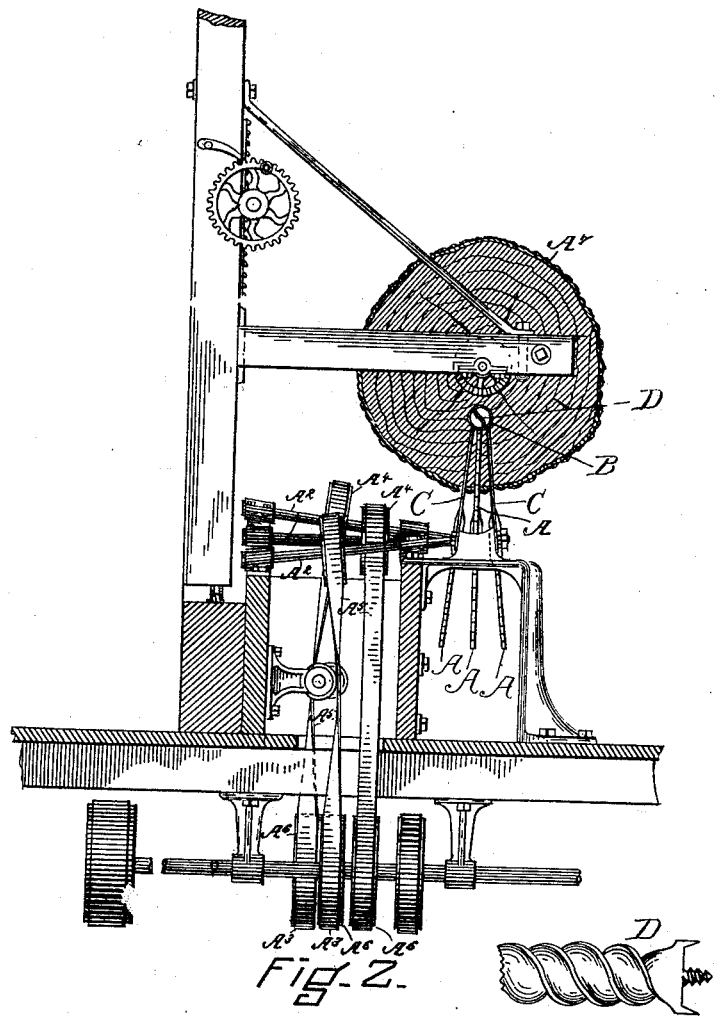
Figure 3:
Figures 4, 5, 6:
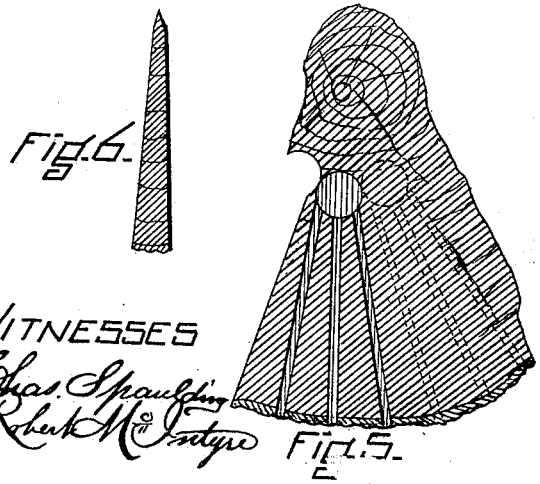

In the drawings of the present improved machine, and which drawings form part of this specification, Figure 1 is a front elevation. Fig. 2 is an end elevation with parts removed. Figs. 3, 4, 5, and 6 are views in detail, hereinafter explained.

In the drawings, A A A represent three similar circular-saw blades having separate arbors $A^2$, each supported and turning in separate stationary bearing-blocks and severally located in the same horizontal plane, and each arranged to be driven by separate pulley-wheels $A^4$ and belts $A^5$ from two driving pulleys, $A^6$, suitably located therefor. These saw-blades A A A are vertical and they are placed in advance of each other, and each in a different vertical plane, which is more or less radial with a given center above them and within the compass of the log $A^7$, horizontally supported lengthwise above them, and from which clapboards are to be sawed by the operation of said saws, as will hereinafter appear. The said saw-blades in operation cut the log $A^7$ in separate lines running along the length of the log, the lines are at such distances apart and have such radial arrangement that the saws secure the desired thickness and bevel of the portion of the log remaining between the said saw-cuts and which makes the clapboards.

The log $A^7$ is centered or supported end to end on a carriage arranged to be moved lengthwise of the bed of the machine, and thereby to present the log to the said saw-blades to be sawed by them and returned to its normal position to be again similarly moved, and, furthermore, the so centered and supported log is capable of being turned over or rotated to suitably present and hold it after each of its runs for again being sawed, as before, and all otherwise as well known in similar machines, excepting, however, that in all previous machines a single saw-blade was used, while in the present invention a series of saw-blades are employed.

The several saw-blades operate simultaneously, and, as is plain, on all the runs of a log centered and supported as stated, three saw-cuts are made in the first run, producing two clapboards, and in all succeeding runs producing three clapboards.

The centering and supporting of the log, the means for moving the log to and back from the saw-blades, and the means for turning the log over or rotating it, all generally referred to in this description and more or less shown in the drawings, of themselves form no part of this invention, and, as they are well known in clapboard-sawing machines, they need no particular description herein.

The several saw-blades saw the log practically to the same depth, and, as usual, the thinner edge of the clapboards produced by them is the nearer to the center of the log.

D is the auger-bit, of the ordinary form, with a cutting end and a spiral or twisted shank. B is a sleeve surrounding and incasing and supporting the auger from end to end. This sleeve and the auger are both horizontal, and the sleeve is supported and is free to turn in stationary standards C of the bed of the machine, and it is at the end of the machine toward which the log travels in its run to be cut by the saw-blades, as stated, and in the horizontal plane of the inner edges of the saw-cuts or the edges toward the center of the log.

The cutting end of the auger D projects slightly beyond the end of the sleeve B which is toward the log, and the auger, at its opposite end, has a pulley-wheel, E, by which, with a suitable belt-connection, to rotate it, and its said surrounding sleeve is also provided with a pulley-wheel, F, and a suitable belt-connection to rotate it and preferably in a direction opposite to the direction of rotation of the auger. The end of the sleeve toward the log is sharpened, Fig. 4, or, as well known, it may have cutting-teeth, and in the run of the log for being operated upon by the circular-saw blades A the log at the same time is bored by the auger along the inner edge of the several saw-cuts made by them, and at the same time the bore so made reamed out by the cutting end of the sleeve surrounding and supporting said auger, the two (auger and sleeve) entering the log and passing through it from end to end, and so entering separating therefrom the clapboards produced by the saws.

The sleeve B may be stationary instead of rotating, and in the boring operation of the auger it serves as a way to conduct the cuttings or chips made by the auger to the outside of the log.

By the machine described, plainly, clapboards can be most rapidly made, and as made separated from the log out of which they are cut. The auger works in a line eccentric to the centers of support to the log, and while it is preferable to employ an incasing and supporting sleeve, as has been described for the auger, the sleeve may be dispensed with. The auger for separating the clapboards from the log as they are sawed may be employed with a single saw-blade in lieu of a series, as described, and, in lieu of three, two or more saws may be used. The advantage of a series is increased production of clapboards in a given number of runs of the log and a reduction of the number of runs of the log necessary to complete its sawing into clapboards.

I am aware that a vertical rotating circular saw blade for sawing a log into clapboards and means for a run of the log lengthwise for being sawed and for holding of the log therefor and for turning it over for successive runs are not new. I am further aware that an auger and an incasing-sleeve therefor have been heretofore employed for boring a log lengthwise; but I am not aware that either or both have been combined with a saw-blade to bore the log as the blade is sawing it, both operations being in lines lengthwise of the log; and, also, I am not aware that means, substantially as described, to bore the log lengthwise have been combined to operate on the log on a line eccentric to the centering of the log in its supports.

Having thus described my invention, what I claim, and desire to secure by Letters Patent, is—

1. In machines for sawing clapboards in which the log to be sawed is carried by a support constructed and arranged for the log to be turned thereon and provided with means for feeding lengthwise the log being sawed, the combination of a circular saw to operate on the log, arranged in a plane more or less radial therewith, means to rotate said saw, an auger to bore said log lengthwise along a line at the inner edge of the cut made by said saw in the log, and means to rotate said auger simultaneously with the rotation of said saw, substantially as described.

2. In machines for sawing clapboards in which the log to be sawed is carried by a support constructed and arranged for the log to be turned thereon and provided with means for feeding lengthwise the log being sawed, the combination of a circular saw to operate on the log, arranged in a plane more or less radial therewith, means to rotate said saw, an auger to bore said log lengthwise and along a line at one side of the central line of the log and at the inner edge of the cut made by the saw in the log, and means to rotate said auger simultaneously with the rotation of said saw, substantially as described.

JAMES McINTYRE.

Witnesses:
   CHAS. SPAULDING,
   W. C. SPAULDING.